(12) United States Patent
Shrikhande et al.

(10) Patent No.: US 7,519,110 B2
(45) Date of Patent: Apr. 14, 2009

(54) SYSTEM AND METHOD FOR IMPROVING DSL PERFORMANCE

(75) Inventors: Kapil Shrikhande, Berkeley, CA (US); Ganesh Krishnamurthi, Danville, CA (US); Raghvendra G. Savoor, Walnut Creek, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 652 days.

(21) Appl. No.: 11/037,847

(22) Filed: Jan. 18, 2005

(65) Prior Publication Data

US 2006/0159162 A1 Jul. 20, 2006

(51) Int. Cl.
*H04B 1/38* (2006.01)

(52) U.S. Cl. .............. 375/222; 370/242; 379/1.01; 398/9; 455/423

(58) Field of Classification Search .......... 375/220, 375/222; 370/242, 465; 725/106; 359/877; 379/9, 29.01

See application file for complete search history.

(56) References Cited

U.S. PATENT DOCUMENTS 6,549,520 B1 * 4/2003 Gross et al. ............ 370/242
2001/0048716 A1 * 12/2001 Gough et al. ............ 375/222
2002/0067824 A1   6/2002 Wang
2002/0075949 A1   6/2002 Banerjea et al.
2004/0120470 A1 * 6/2004 Cambron et al. .......... 379/1.04

OTHER PUBLICATIONS

International Search Report, International Patent Application No. PCT/US06/01677, mailed Feb. 1, 2008, 3 pages.

* cited by examiner

*Primary Examiner*—David C Payne
*Assistant Examiner*—Adolf Dsouza
(74) *Attorney, Agent, or Firm*—Jackson Walker L.L.P.

(57) ABSTRACT

A system and method is described for determining a condition of a communication line, such as the absence of a filter device on a digital subscriber line (DSL). A first signal characterized by a high upstream power is activated over the line, and a first set of parameters associated with the communication line is obtained. A second signal characterized by a low upstream power is activated, and a second set of parameters associated with the communication line is obtained. Comparison of first and second sets of parameters is indicative of a condition of the connection and presences or absence of a DSL filter on the communication line.

21 Claims, 6 Drawing Sheets

SYSTEM AND METHOD FOR IMPROVING DSL PERFORMANCE

BACKGROUND OF THE INVENTION

1. Field of the Invention

The present invention relates to the field of network communications and in particular, relates to a system and method for improving the performance of a communication line such as an asymmetrical digital subscriber line (ADSL) by detecting the source of problems at a user end of the communication line.

2. Description of the Related Art

Various Digital Subscriber Loop (DSL) communication systems utilize the telephone local subscriber loops to carry high speed digital transmission. Examples of DSL services include asymmetric DSL (ADSL), high-rate DSL (HDSL), very high-rate DSL (VDSL) and others. The different types of DSL service are generally referred to as xDSL. The xDSL services share the telephone wires with traditional telephony, commonly referred to as plain old telephone service (POTS).

xDSL and POTS use different frequency bands for communication; POTS signals are restricted to frequencies below 4 kHz, while xDSL signals use frequencies greater than 4 kHz. The frequency band plans depend on the specific XDSL technology, e.g. ADSL-1 uses~25-1100 kHz. At the end of the communication line, the xDSL and POTS channels are electrically seperated by using filters. These filters come in two main forms: one is the POTS splitter that splits (and combines) DSL and POTS signals, while the other is the inline filter that only allows POTS signals to pass through. FIG. 1 shows the configurations in which the splitter and inline filter is used. In this document, we do not distinguish between the two types of filter devices, and simply refer to them as microfilters, filters, DSL filters, or DSL microfilters.

FIG. 1 illustrates the installation configuration of the two commonly used DSL microfilters, typically installed at the end user location for the network related to the present invention. FIG. 1 shows an inline filter 101 that is often installed between an outside connection 103 and a local telephone 105. An inline filter usually comprises a low pass filter (bandwidth of about 4 kHz) for passing lower frequency POTS signals. FIG. 1 shows a 3-port splitter with a line port 114 for carrying both POTS as well as DSL signals. A POTS port 118 connects to the telephone and carries POTS, and port 116 that connects to the DSL modem carries DSL signals. A 3-port splitter generally combines a high-pass filter for passing DSL signals and a low-pass filter for passing POTS signals. The splitter can be installed by the service technician or self-installed, wheareas the inline filter is almost always self-installed.

The microfilter reduces the DSL power imparted on to the telephone electronics, protecting the xDSL channel from the harmonics and intermodulation products generated due to the non-linearities present in most telephones, referred to as non-linear echo in this document. Specifically, for ADSL, if upstream signals are allowed to reach the telephone device, they can be upconverted in frequency due to non-linearities in the telephone device and cause interference in the downstream channel. The microfilter is critical in reducing this effect. In this document, upstream refers to the communication from the customer premises equipment or CPE to the central office or CO, while downstream refers to communication from CO to CPE. The microfilter also protects the xDSL service from transients caused by the telephone going from on-hook to off hoof (and vice-versa), as well as associated impedance changes. Not using a microfilter can severely degrade the performance of the DSL channel.

Since microfilters are typically distributed to new DSL customers for self-installation, it is possible, even likely that a certain percentage of customers will neglect to install these filters. It is also possible that the microfilters are not connected in front of each and every telephone in the home. In short, there can be many reasons why microfilters do not get installed as required, putting the DSL channel at risk from the POTS service.

Therefore, for DSL service providers, it is important to diagnose this condition in order to correct it and ensure a high quality DSL channel. A prior method for detecting missing microfilters tends to measure the nonlinear echo on a line directly. Excessive levels of nonlinear echo can be an indication of that a DSL micro-filter is missing. However, this method is not currently engineered into existing installations; it is not a part of upcoming ADSL standards; and upgrading current installations to newer CPEs that can detect nonlinear echo can be costly.

Sending a repair truck to diagnose a missing micro-filter is extremely costly and inefficient. By contrast, instructing a customer to self-install a filter is simple and cheap, provided the service provider knows which customers lack such filtering. Therefore, a real need exists for a diagnostic that can detect the absence of a microfilter on a DSL line. Moreover, for practical reasons, the diagnostic technique should be automated and should be controlled from the CO.

SUMMARY OF THE INVENTION

The present invention provides a system and method for detecting the cause of performance degradation or impairment on a communication line, such as can result from the absence of a microfilter at the customer end of an ADSL line. A first signal characterized by having a high upstream power is activated over the communication line. A first set of downstream performance parameters is obtained over time resulting from application of the first signal. A second signal having a low upstream power is then activated over the communication line characterized by having a low upstream power. A second set of downstream performance parameters is obtained over time resulting from the second signal. The behavior of downstream performance parameters over time is indicative of the impairment on the communication line. Comparison of the first set and the second set of performance parameters indicates the presence or absence of a DSL filter device.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For a detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

Figure 1:
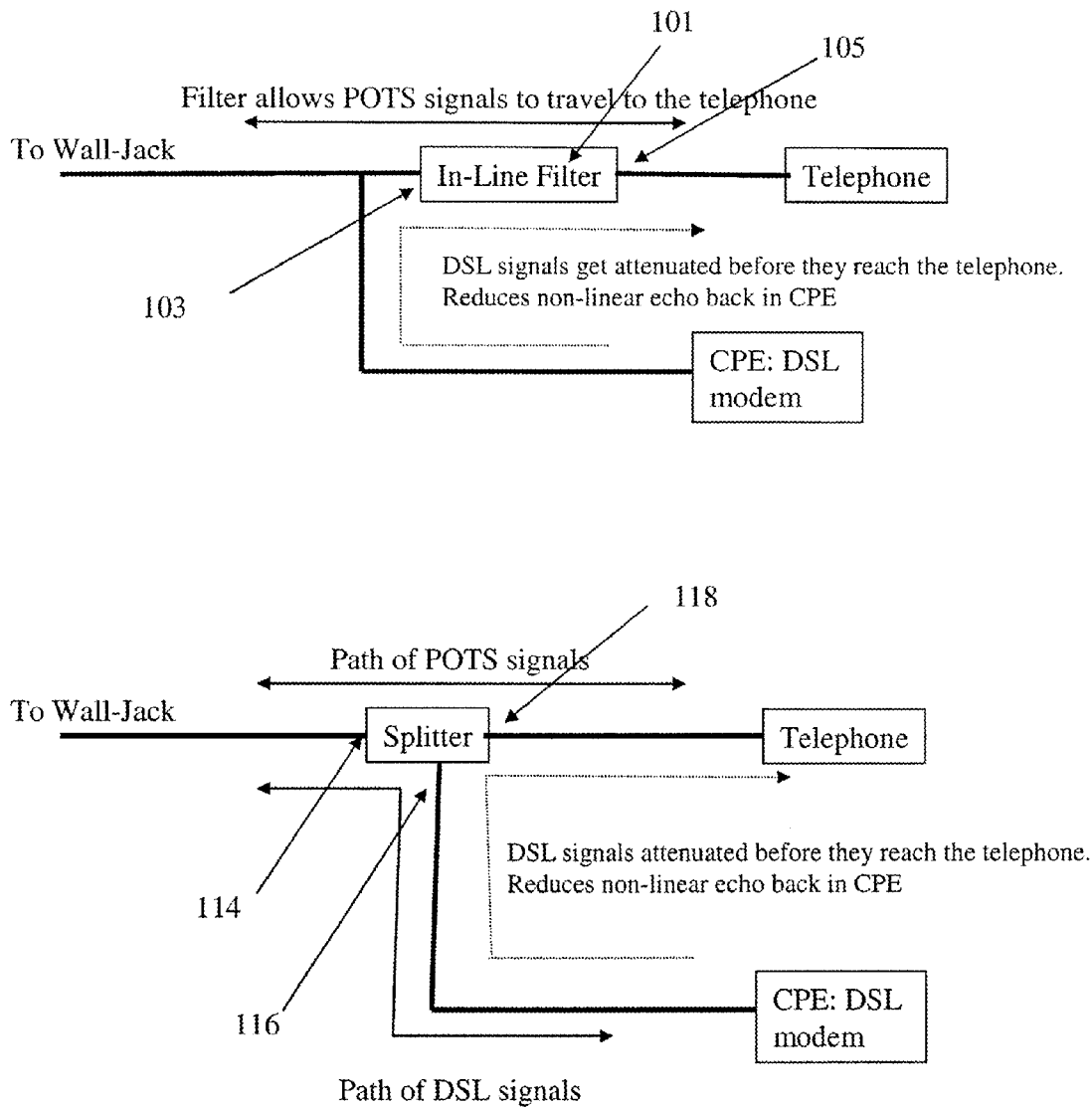
FIG. 1 illustrates the installation configuration of commonly used DSL filters at the user end of the communication line.
Figure 2:
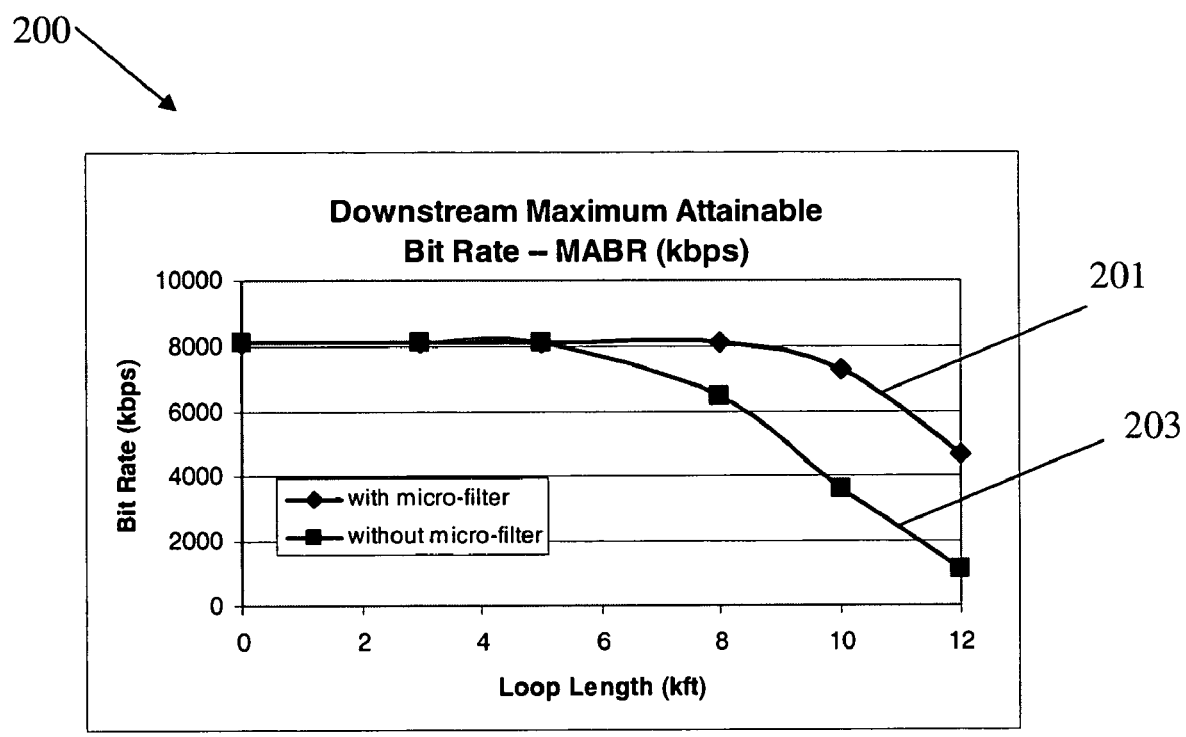
FIG. 2 illustrates behavior of a performance parameter obtained from a DSL communication line experiencing various degrees of impairment.

FIG. 2 shows measurements 200 of a parameter which is the capacity of the ADSL communication channel: the Maximum Attainable Bit Rate (MABR); also referred to as the Attainable Net Data Rate (ATTNDR) in ADSL standards. It is important to note that this is not the Shannon capacity of the channel, but it is a capacity metric calculated by the ADSL modems based on the signal to noise ratio (SNR) measured on the line: in short the modem cannot operate at a bit-rate greater than the MABR. This metric is therefore sensitive to the modem implementation and the ADSL standard it adheres to. Importantly, changes in signal loss and additive noise are reflected in this parameter. FIG. 2 illustrates the impact that a missing micro-filter has on the downstream ADSL channel. It shows the MABR measured with a micro-filter connected in front of the telephony circuit (201) and without a micro-filter connected (203), as a function of the length of the loop the signal travels across. The bit-rate is on the y-axis in thousands of bits per second (kbps), while the loop length is on the x-axis in thousands of feet (kft). FIG. 2 demonstrates that for a loop-length greater than about 6 kft, the maximum bit-rate obtained without a micro-filter present is lower than the maximum bit-rate obtained with micro-filter present. This is because the nonlinear echo caused when the microfilter is absent adds to the noise and lowers the SNR. It seems that bit-rates obtained on loop lengths less than 6 kft seem generally unaffected by missing filters. That is only because the maximum bit-rate hits a ceiling determined by the ADSL standard for loops shorter than 6 kft. The Shannon capacity, if calculated, will be higher for all loop lengths when a micro-filter is used. Therefore the absence of a micro filter causes a considerable drop in ADSL downstream data rate.

Figure 3:
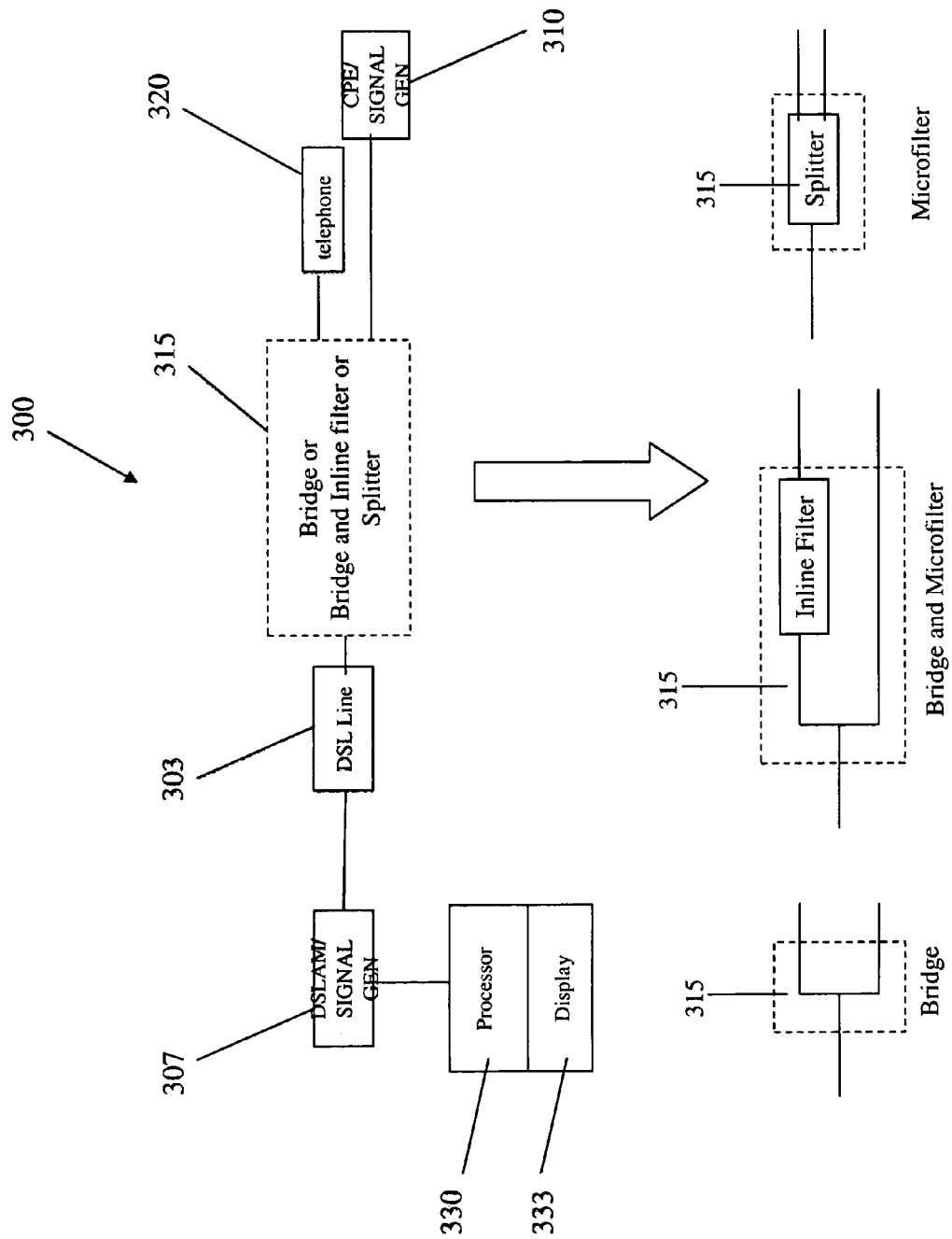
FIG. 3 illustrates an exemplary network connection in one aspect of the present invention.

FIG. 3 shows two embodiments of an exemplary system of network connectivity over which the method of the present invention can be utilized. A processor 330, and display 333, well known in the art are connected to a DSLAM (Digital Subscriber Line Access Multiplexer) 307 which includes a signal generator. The DSLAM is coupled to a DSL communication line 303. A DSLAM is a mechanism at a phone company's central location that terminates many DSL lines and provides the DSL lines with connectivity to the rest of the network. Upstream and downstream performance parameters for each DSL line are commonly stored at the DSLAM. Downstream parameters are measured and computed by the CPE and are transmitted to the DSLAM (this is part of the ADSL standard) for storage. Upstream parameters are measured and computed by the DSLAM itself. The DSLAM records these parameters for all DSL lines that it serves. The DSL line 303 is a physical loop. For purposes of illustration of the present invention, the DSL line provides sufficient length to give rise to the effects of a missing micro-filter. A typical loop length could be 12 kft, and might have an associated noise level, such as −140 dBm/Hz of additive white gaussian noise. Output of the DSL line 303 is coupled to both a CPE 310 and to telephone 320, through a combination of bridge and filters 315. A subset of the different configurations in which the bridge and filter can be connected are shown below in FIG. 3. It should be noted that the microfilter can be either an inline filter or a splitter. A bridge is not necessary when a splitter is used, but is needed when an inline filter is used. Even though only 3 configurations of bridge and filtering are shown, the invention is not limited to any particular configuration, and is independent of the particular configuration (for e.g. two bridges may be used back to back before using an inline filter; or two telephone sets may be present; etc.). The processor monitors and records DSL performance parameters for the DSL line and displays them on display 333 when requested.

Figure 4:
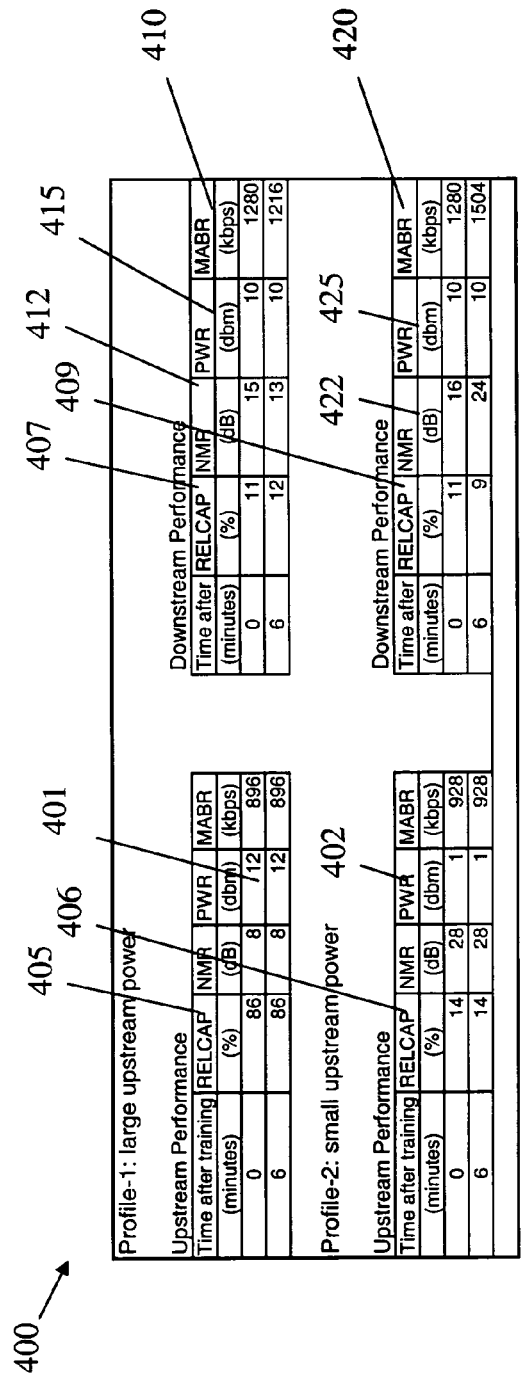
FIGS. 4 and 5 illustrate the various performance parameters obtained over a communication line under various degrees of impairment.

FIG. 4 shows measurements of performance parameters of a network connection, such as shown in FIG. 3. One possible diagnostic sequence of the present invention is discussed herein. Two ADSL profiles referred to herein as Profile-1 and Profile-2 (definition of profile follows) having different upstream bit-rates and transmitter power levels are separately activated over the DSL line 303. An ADSL profile is associated with a predetermined list of configuration parameters programmed into the DSLAM that the DSLAM and modem aim to achieve and maintain for the lifetime of the circuit. The DSLAM can hold a finite number of profiles in memory. The processor 330 can activate any stored profile on a DSL line in an automated manner. The configuration parameters that define a profile include but are not limited to the minimum and maximum operating Bit Rate, the minimum and maximum SNR Margin, the forward error correction (FEC) Bytes, Symbols per codeword, Interleaved Delay, Trellis Coding, Overhead Framing, Bit Swapping, Power Boost, and Bit Rate Alarm Threshold. These configuration parameters are in both upstream and downstream directions. As mentioned earlier, the DSLAM records the performance parameters of the DSL line at training time, and during the continued operation of the DSL connection, sometimes referred to as ShowTime. These parameters and their inter-dependence is briefly described below.

Training the line is a negotiation process between the DSLAM and the CPE in which the two arrive at the highest possible bit-rate that is between the minimum and maximum operating bit-rates specified in the ADSL profile. In doing so, the modems settle on an SNR margin and transmitted power that lies between the minimum and maximum allowed. If the minimum SNR margin cannot be achieved, the modems will cut back on the bit-rate, so as to ensure the stablility of the connection. Typically, long loops require larger transmitted power to maintain a good quality signal at the receiver. Also, to achieve a higher operating bit-rate on the same DSL line typically requires larger transmitted power. The modems also calculate the maximum attainable bit-rate (MABR) from the SNR measured at training time. The upstream MABR is calculated by the modem in the DSLAM and downstream MABR is calculated by the modem in the CPE. After training is over, the modems continue to optimize the operating point of the channel in face of changing line conditions (ShowTime). For that purpose, the modems allow the SNR margin to float between minimum and maximum; change the transmitted power, change the bit-loading per ADSL sub-carrier, etc. For e.g., if additive noise increases, the modem may allow the SNR margin to decrease. If the margin is too close to the minimum allowed, it may increase the transmitted power to compensate for the additional noise, until the SNR margin returns to a healthy level. Higher MABR always indicates a better quality DSL line. A higher SNR margin is also indicative of a healthier line, all other parameters being equal. If a DSL line requires larger transmitted power than it usually needs, it can be indicative of excessive signal loss or noise.

Profile-1 is characterized by a having high upstream maximum operating bit-rate, the DSLAM programs Profile-1, which in turn causes the CPE to transmit at a higher power to accommodate the higher bit-rate. Thus, Profile-1 is referred to as a high power profile. Profile-2 is characterized by having a low upstream maximum operating bit-rate, thus, the DSLAM programs Profile-2, which accordingly causes the CPE to transmit at a lower power. Thus, Profile-2 is referred to as low power profile. In one embodiment of the invention, the upstream maximum operating bit-rate of Profile-1 is 768 kbps, while that of Profile-2 is 64 kbps. In the same embodiment of the invention, the loop used is 12 kft in length. Under these conditions, the operating bit-rate affects the power that is transmitted by the DSLAM modem (upstream); and the upstream power level of Profile-1 is approximately +12 dbm (high) and that of Profile-2 is approximately +1 dbm (low). The invention calls for Profile-1 to be established over the line. After training is over, performance data for the upstream and downstream channels is captured. Furthermore, the data is gathered multiple times after training is over, at intervals specified by the user. For the purposes of the present discussion, the end of training (the moment at which a data link is established) indicates the 0-minute mark. In FIG. 4, for example, data is gathered at the 0-minutes mark and again 6 minutes later. The invention then calls for Profile-2 to be activated on the line. Similar to Profile-1, data is gathered at the 0-minute mark and at the 6-minute mark. The 12 dB power difference between the high and low power signals is exemplary only. The power difference can be lower or higher depending on the communication line length and noise on the line. For example, a 1 dB power difference may be suitable for a shorter line length with little noise on the line. Higher power differences may be required for longer lengths and higher noise levels.

Figure 5:
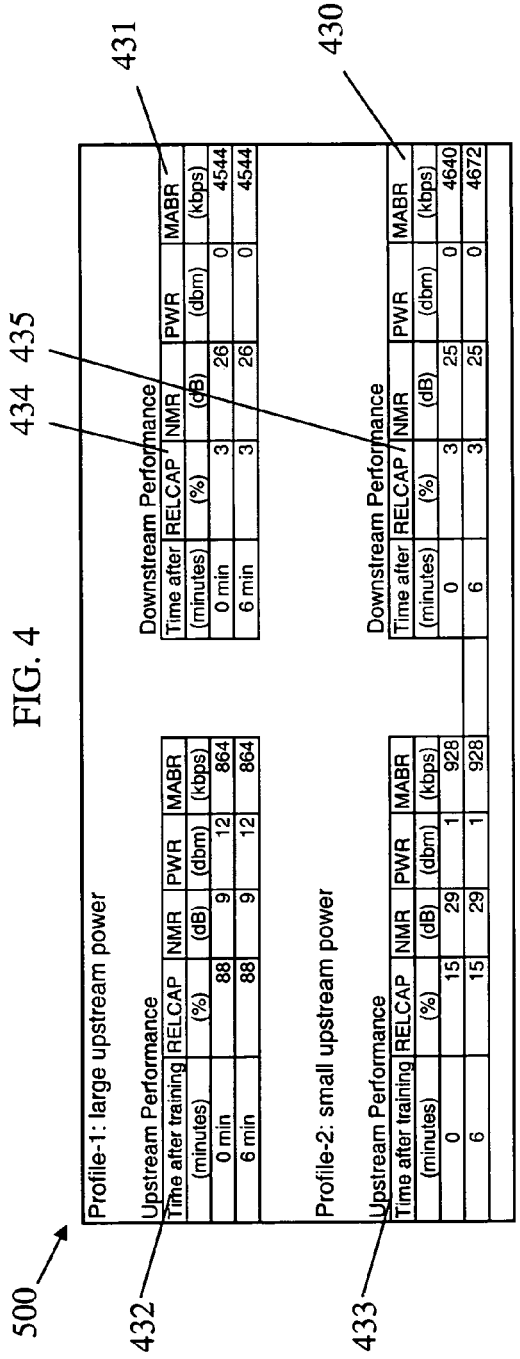

FIG. 4 illustrates a display of performance parameters 400 for both upstream 405, 406 and downstream 407, 409 transmission directions, obtained during a diagnostic sequence in which a filter is not present on the communication line. FIG. 5 illustrates a display of performance parameters 500 for both upstream 432, 433 and downstream 434, 435 transmission directions, obtained during a diagnostic sequence in which a DSL filter is present on the communication line. A first set of performance parameters 405, 412 is obtained for when the signal comprising Profile-1 is activated, and a second set of performance parameters 407, 409 is obtained for when the signal comprising Profile-2 is activated. The first set of performance parameters 405, 407 is shown in the top row. The second set of performance parameters 406, 409 is similarly displayed in the bottom row. Upstream performance parameters are recorded in the tables on the left side, and downstream performance parameters are displayed in the tables on the right side. Standard performance parameters for determining a line performance can be observed, some of which include maximum attainable bit-rate (MABR), SNR noise margin (NMR), and transmitted power level (PWR) that have been described earlier in the document. The performance parameters are exemplary only. Additional or different performance parameters such as bit error rate can be used to determine performance differences indicative of the cause of an impairment on the communication (DSL) line.

Referring now to FIG. 4 which depicts results when a DSL micro-filter is not present, upstream power 401 for Profile-1 is +12 dbm, and upstream power 402 for Profile-2 it is +1 dbm. When Profile-1 is activated, the downstream MABR 410 slightly degrades over time from 1280 kbps at 0 minutes to 1216 kbps at 6 minutes. Concurrently, the downstream NMR 412 also degrades from 15 dB at 0 minutes to 13 dB at 6 minutes. The downstream power 415 remains at constant levels over the 6-minute test period (+10 dBm). When Profile-2 is activated, the downstream MABR 420 increases from 1280 kbps at 0 minutes to 1504 kbps at 6 minutes, a significant improvement, and the NMR 422 also increases from 16 dB at 0 minutes to 24 dB at 6 minutes (also significant). In summary, downstream MABR and NMR for Profile-2 improve significantly over time, while the same parameters remain almost unchanged for Profile-1. The main difference between Profile-1 and Profile-2 is the upstream data-rate and power. When a filter is absent, as in the case in FIG. 4, different upstream power will result in different levels of nonlinear echo and associated impairment. The Downstream power 425 remains constant in both cases.

Referring now to FIG. 5, (in which a DSL micro-filter is present), the upstream power for the two profiles is +12 dbm and +1 dbm (same as in FIG. 4). However, downstream performance parameters remain substantially unchanged. For example, the downstream MABR 431 for Profile-1 remains substantially unchanged from 0 minutes to 6 minutes. Downstream MABR also remains substantially unchanged for Profile-2 430 (from 4640 kbps at 0 minutes to 4672 kbps at 6 minutes). Thus, when a micro-filter is present, non-linear echo is substantially reduced, and the power level of the upstream signal does not significantly affect the downstream performance parameters.

The results of FIGS. 4 and 5 are discussed below in general. If a micro-filter is present (FIG. 5), nonlinear echo is reduced, and performance parameters associated with either profile tend to exhibit no substantial deviation over time. If a micro-filter is not present (FIG. 4), then after a sufficiently long time (e.g., 6 min after training), the downstream performance parameters (i.e., NMR, MABR) manifest deviation. More specifically, when a micro-filter is not present, the downstream-MABR for Profile-1 (high upstream power) either degrades or remains substantially unchanged, while the downstream-MABR for Profile-2 (low upstream power) increases with time. A processor 330 is able to determine the absence of a micro-filter using the system and method of the present invention by monitoring the downstream performance parameters associated with Profile-1 and Profile-2.

The deviation of performance parameters over time is important to note. The training process uses a certain pattern of upstream signals that create equal amounts of non-linear echo regardless of the Profile that is going to be imposed on the line. As a result, the downstream performance parameters measured at 0 minutes after training are unaffected by the upstream power level of the immediately applied profile (i.e., MABR at 0 minutes mark is same for both Profile-1 and Profile-2 when filter is missing). However, once Profile-1 or Profile-2 is activated and the effects of the different upstream power levels between Profile-1 and Profile-2 become apparent, the two profiles result in different non-linear echo and therefore different MABR at the 6 minute mark, if the filter is missing. Hence deviation in downstream performance is seen over time. The deviation can be seen even after 3 minutes. However, in some instances, the deviation in performance may continue to increase even after 3 minutes. Therefore, the invention calls for a 6 minutes wait to ensure that enough time is allowed for the CPE to update its performance parameters and to transmit the updated parameters back to the DSLAM.

Figure 6:
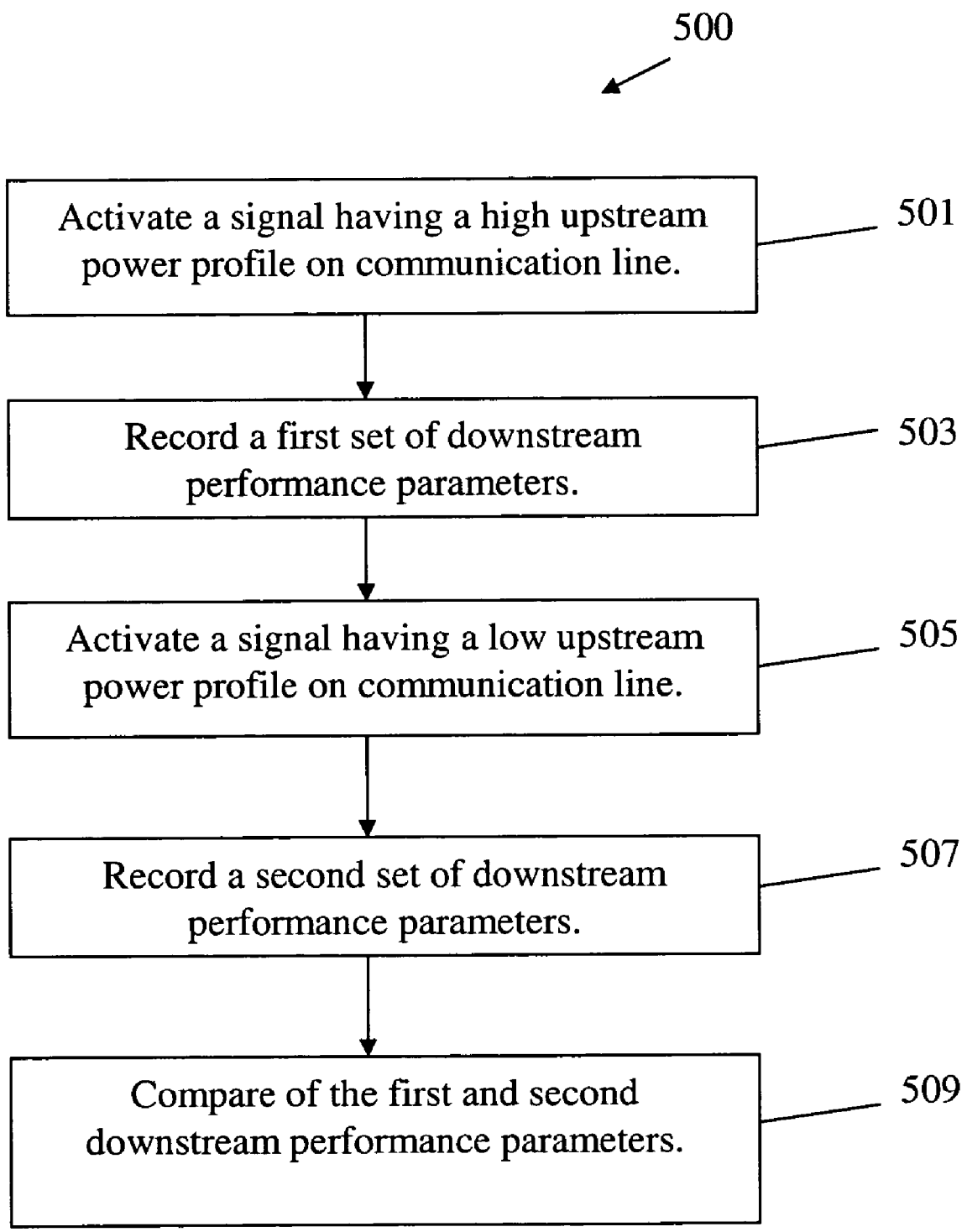
FIG. 6 illustrates a flowchart of one aspect of the present invention.

FIG. 6 shows a flowchart 500 of one aspect of the present invention. In Box 501, a first signal comprising a training procedure and a high upstream power profile is activated on the communication line. A first set of downstream performance parameters associated with the first signal is recorded in Box 503. Data can be recorded at intervals chosen by the user. One possible recording timetable could be at 0, 3, 6, 9, and 12 minutes after training is over. In Box 505, a second signal comprising a training procedure and a low upstream power profile is activated on the communication line. A second set of downstream performance parameters associated with the second signal is similarly recorded at Box 507. In Box 509, a comparison of the downstream performance parameters associated with the first signal and the second signal is made to determine the cause of the impairment of the communication link, i.e., the presence or absence of a micro-filter.

Figure 7:
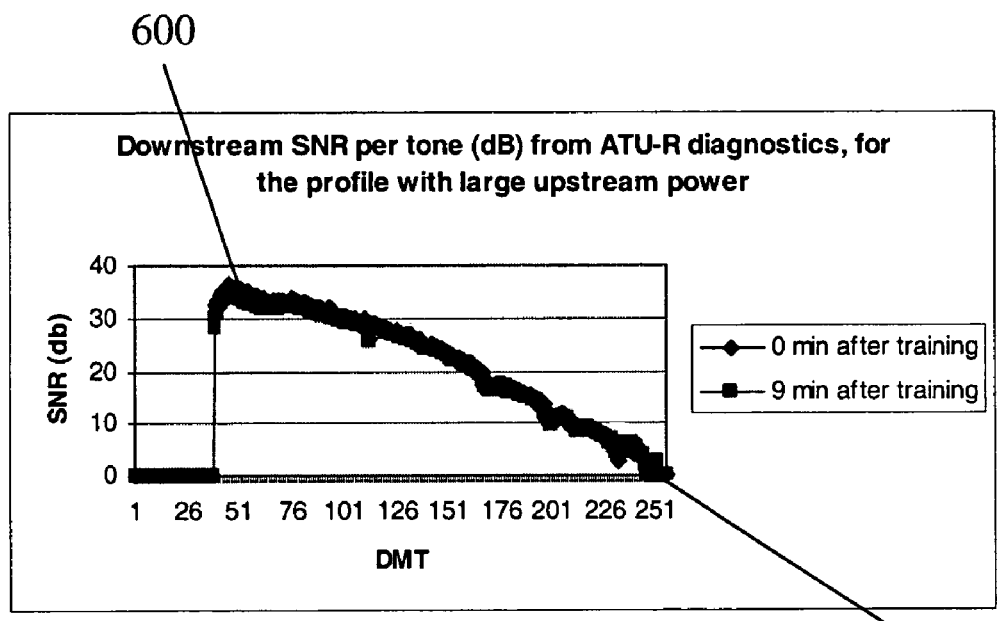
FIGS. 7 and 8 illustrate behavior of performance parameters obtained from a communication line by activated signals having various power levels.
Figure 8:
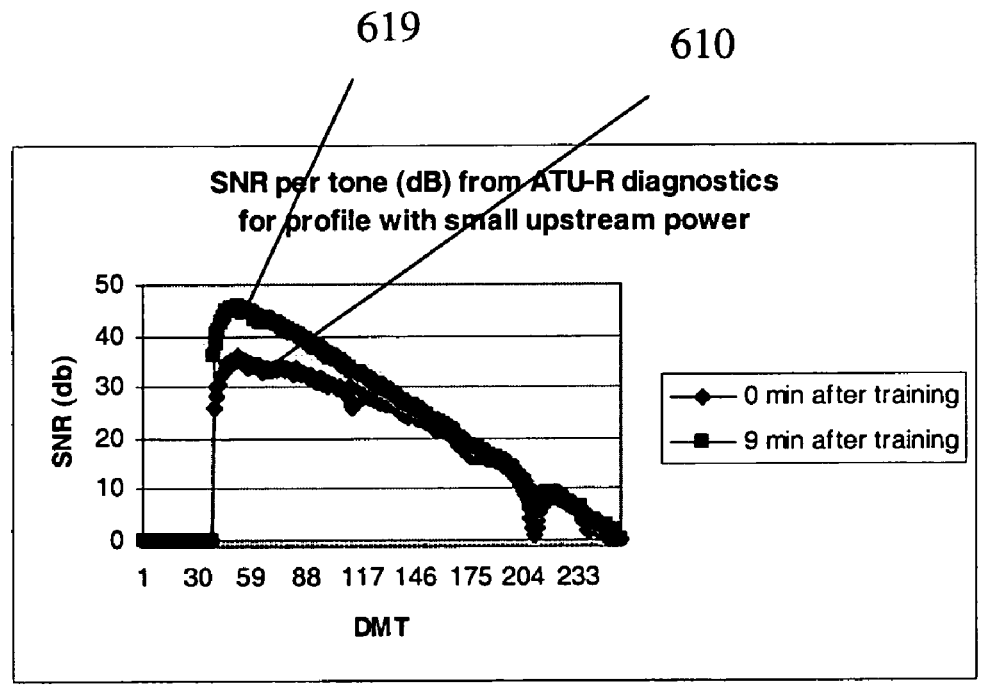

The system and method of the present invention provides for monitoring of a variety of performance parameters. FIG. 7 shows an alternative method for determining the presence or absence of a micro-filter. A downstream SNR measured by the CPE for two profiles having different upstream powers and is recorded at 0 and 9 minutes after training. In the present embodiment of the invention, the SNR is recorded individually for each DMT tone. DMT stands for discrete multi tone, a technology that uses individual frequency tones to carry data. Hence the parameter recorded is the SNR per tone, or SNR[n] where n represents the index. The ADSL standard uses DMT transmission with 256 tones: n=[0 . . . 255]. Measurements displayed in FIG. 7 are obtained in the absence of the micro-filter on the telephone line. FIG. 7 shows the SNR[n] measured when a signal comprising a high upstream power profile, such as Profile-1, is activated over the line connection. There is no significant difference in the SNR[n] measured at 0 minutes (600) and 9 minutes (609) after training is over (SNR at the 9 minutes mark is only slightly lower than that at the 0 minute mark). FIG. 8 shows the SNR[n] measured for when a signal comprising a low upstream power profile, such as Profile-2, is activated over the line connection. The SNR[n] measured 9 minutes 619 after training is significantly higher than the SNR[n] immediately after training is over 610.

The results of FIGS. 7 and 8 are in line with the downstream MABR results of FIGS. 4 and 5. The slight degradation over time of downstream SNR[n] in FIG. 7, for the signal comprising Profile-1, corresponds to the slight degradation observed in downstream parameters 412 and 410 in FIG. 4. The significant increase over time of downstream SNR[n] in FIG. 8, for the signal comprising Profile-2, again corresponds to the significant increase observed in downstream parameters 420 and 422 in FIG. 4.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for broadband communications links (e.g. ADSL, VDSL), the Internet, and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A computerized method for detecting a cause of an impairment of a communication link, comprising:
   a processor for activating a high upstream data rate signal on the communication link;
   recording a first downstream performance for the communication link resulting from the high upstream data rate signal;
   activating a low upstream data rate signal on the communication link;
   recording a second downstream performance for the communication link resulting from the low upstream data rate signal;
   comparing the first and second downstream performances for the communication link to determine the cause of the impairment of the communication link; and
   indicating that a filter is missing from the communication line when the first downstream performance improves less than the second downstream performance over time.

2. The method of claim 1, wherein the cause of the impairment further comprises an absence of a filtering device on the communication link.

3. The method of claim 1, wherein the communication link further comprises a digital subscriber line (DSL).

4. The method of claim 1, wherein the low upstream data rate signal has a power less than the high upstream data rate signal.

5. The method of claim 1, wherein the low upstream data rate signal has a power that is at least 1 dB less than the high upstream data rate signal.

6. The method of claim 1, wherein the downstream performance further comprises at least one of a maximum attainable bit-rate, bit error rate, noise margin and transmit power.

7. A computer readable medium containing instructions that when executed by a computer perform a method for detecting a cause of an impairment of a communication link, comprising:
- activating a high upstream data rate signal on the communication link;
- recording a first downstream performance for the communication link resulting from the high upstream data rate signal;
- activating a low upstream data rate signal on the communication link;
- recording a second downstream performance for the communication link resulting in the low upstream data rate signal;
- comparing the first and second downstream performances for the communication link to determine the cause of the impairment of the communication link; and
- indicating that a filter is missing from the communication line when the first downstream performance improves less than the second downstream performance over time.

8. The medium of claim 7, wherein in the method, the cause of the impairment further comprises an absence of a filtering device on the communication link.

9. The medium of claim 7, wherein in the method the communication link further comprises a digital subscriber line (DSL).

10. The medium of claim 7, wherein the low upstream data rate signal has a power less than the high power upstream signal.

11. The medium of claim 7, wherein the low upstream data rate signal has a power that is at least 1 dB less than the high upstream data rate signal.

12. The medium of claim 7, wherein in the method the downstream performance further comprises at least one of a maximum attainable bit-rate, bit error rate, noise margin and transmit power.

13. A system for detecting a cause of an impairment of a communication link, comprising:
- a customer premises equipment (CPE) for communication on the communication link; and
- a processor programmed to command a Digital Subscriber Line Access Multiplexer (DSLAM) to activate a low power upstream signal from the CPE on the communication link and monitor a first downstream performance for the communication link resulting from the low power upstream signal, the processor further programmed to command the DSLAM to activate a high power upstream signal on the communication link and monitor a second downstream performance for the communication link resulting from the high power upstream signal, the processor further programmed to determine the cause of the impairment of the communication link from the first and second downstream performances, and the processor further programmed to indicate that a filter is missing from the communication line when the first downstream performance improves less than the second downstream performance over time.

14. The system of claim 13, wherein the DSLAM programs a high upstream data rate on the communication link to activate a high power upstream signal on the communication link.

15. The system of claim 13, wherein the DSLAM programs a low upstream data rate on the communication link to activate a low power upstream signal on the communication link.

16. The system of claim 13, wherein the cause of the impairment further comprises an absence of a filtering device on the communication link.

17. The system of claim 13, wherein the communication link further comprises a digital subscriber line (DSL).

18. The system of claim 13, wherein the low power upstream signal has a power less than the high power upstream signal.

19. The system of claim 13, wherein the low power upstream signal has a power that is at least 1 dB less than the high power upstream signal.

20. The system of claim 13, wherein the downstream performance further comprises at least one of a maximum attainable bit-rate, bit error rate, noise margin and transmit power.

21. A system for detecting a cause of an impairment of a communication link, comprising:
- a customer premises equipment (CPU for communication on the communication link; and
- a processor programmed to command a Digital Subscriber Line Access Multiplexer (DSLAM) to activate a low power upstream signal from the CPE on the communication link and monitor a first downstream performance parameter for the communication link resulting from the low power upstream signal, the processor further programmed to command the DSLAM to activate a high power upstream signal on the communication link and monitor a second downstream performance parameter for the communication link resulting from the high power upstream signal, the processor further programmed to determine the cause of the impairment of the communication link from the first and second downstream performance parameters, and the processor further programmed to compare the first and second downstream performance parameters including observing the first and second downstream performance parameters over times;
- wherein the first and second performance parameters are selected from the group of performance parameters consisting of a maximum attainable bit-rate, a bit error rate, a noise margin, and a transmit power.

* * * * *

UNITED STATES PATENT AND TRADEMARK OFFICE
CERTIFICATE OF CORRECTION

PATENT NO. : 7,519,110 B2  Page 1 of 1
APPLICATION NO. : 11/037847
DATED : April 14, 2009
INVENTOR(S) : Kapil Shrikhande, Ganesh Krishnamurthi and Raghvendra G. Savoor It is certified that error appears in the above-identified patent and that said Letters Patent is hereby corrected as shown below:

Col. 10 lines 26-51

Please correct Claim 21 as follows:

21. A system for detecting a cause of an impairment of a communication link, comprising:

a customer premises equipment (~~CPU~~ (CPE) for communication on the communication link; and a processor programmed to command a Digital Subscriber Line Access Multiplexer (DSLAM) to activate a low power upstream signal from the CPE on the communication link and monitor a first downstream performance parameter for the communication link resulting from the low power upstream signal, the processor further programmed to command the DSLAM to activate a high power upstream signal on the communication link and monitor a second downstream performance parameter for the communication link resulting from the high power upstream signal, the processor further programmed to determine the cause of the impairment of the communication link from the first and second downstream performance parameters, and the processor further programmed to compare the first and second downstream performance parameters including observing the first and second downstream performance parameters over ~~times~~ time;

wherein the first and second performance parameters are selected from the group of performance parameters consisting of a maximum attainable bit-rate, a bit error rate, a noise margin, and a transmit power.

Signed and Sealed this

Twenty-sixth Day of May, 2009

JOHN DOLL
*Acting Director of the United States Patent and Trademark Office*